(12) United States Patent
Radomski et al.

(10) Patent No.: US 8,969,826 B2
(45) Date of Patent: Mar. 3, 2015

(54) FLOWTHROUGH LABYRINTH DEVICE FOR USE IN DETECTION OF RADIATION IN FLUIDS AND METHOD OF USING SAME

(71) Applicants: Arthur Radomski, Bristol, CT (US); Lee L. Nemeth, Prospect, CT (US)

(72) Inventors: Arthur Radomski, Bristol, CT (US); Lee L. Nemeth, Prospect, CT (US)

( * ) Notice: Subject to any disclaimer, the term of this patent is extended or adjusted under 35 U.S.C. 154(b) by 189 days.

(21) Appl. No.: 13/733,311

(22) Filed: Jan. 3, 2013

(65) Prior Publication Data

US 2014/0183375 A1 Jul. 3, 2014

(51) Int. Cl.
*G01J 1/42* (2006.01)
*G01T 1/00* (2006.01)

(52) U.S. Cl.
CPC ........................... *G01T 1/003* (2013.01)
USPC ........... 250/395; 250/372; 250/428; 250/435; 62/264

(58) Field of Classification Search
USPC ......................................... 250/395, 428, 372
See application file for complete search history.

(56) References Cited

U.S. PATENT DOCUMENTS

| | | | |
|---|---|---|---|
| 2,961,541 A | 11/1960 | Ruderman | |
| 3,705,985 A | 12/1972 | Manning et al. | |
| 3,723,732 A | 3/1973 | Larson et al. | |
| 3,816,743 A | 6/1974 | Ting et al. | |
| 3,823,316 A | 7/1974 | Boswell | |
| 4,141,687 A | 2/1979 | Forrest et al. | |
| 4,206,746 A | 6/1980 | Chubb | |
| 4,301,370 A | 11/1981 | Bauer | |
| 4,676,896 A | 6/1987 | Norton | |
| 4,841,151 A | 6/1989 | Shope | |
| 4,856,042 A | 8/1989 | Staron et al. | |
| 4,876,056 A | 10/1989 | Clayton et al. | |
| 5,229,604 A | 7/1993 | Larson et al. | |
| 5,379,832 A | 1/1995 | Dempsey | |
| 5,833,442 A | 11/1998 | Park et al. | |
| 5,856,670 A | 1/1999 | Rapkin et al. | |
| 5,923,431 A | 7/1999 | Masterson et al. | |
| 5,928,194 A | 7/1999 | Maget | |
| 5,960,160 A | 9/1999 | Clark et al. | |
| 6,527,531 B2 | 3/2003 | Fujita et al. | |
| 6,546,786 B2 | 4/2003 | Lee | |
| 6,547,963 B1 | 4/2003 | Tsai | |
| 6,607,027 B2 | 8/2003 | Bosch et al. | |
| 6,932,903 B2 | 8/2005 | Chang | |
| 7,578,933 B1 | 8/2009 | Selman | |
| 8,067,749 B2 | 11/2011 | Kauling et al. | |
| 2008/0159476 A1 | 7/2008 | Koltick et al. | |
| 2008/0197291 A1* | 8/2008 | Gerardi-Fraser et al. | 250/372 |
| 2009/0145855 A1* | 6/2009 | Day et al. | 210/748 |

(Continued)

*Primary Examiner* — David Porta
*Assistant Examiner* — Abra Fein
(74) *Attorney, Agent, or Firm* — Ware, Fresola, Maguire & Barber LLP (57) ABSTRACT

The present invention provides a continuous flowthrough labyrinth device that has a detector well formed therein in which a radiation detection device may be placed. The continuous flowthough labyrinth device allows a fluid sample to be introduced into the flow path of the device so that the fluid sample evenly surrounds the top and side surfaces of the detector well, which results in the fluid sample being evenly distributed around the radiation detection device. The continuous flowthrough labyrinth device may be connected to any radiation level fluid monitoring system, for example systems used by municipalities and/or industries. The continuous flowthrough labyrinth device may be placed such that fluids entering and/or exiting systems are monitored for radiation, or even placed to determine the radiation levels of fluids within systems.

17 Claims, 5 Drawing Sheets

(56) References Cited

U.S. PATENT DOCUMENTS

2011/0309257 A1   12/2011   Menge
2012/0011874 A1*  1/2012   Conradt et al. ................ 62/264

* cited by examiner

FLOWTHROUGH LABYRINTH DEVICE FOR USE IN DETECTION OF RADIATION IN FLUIDS AND METHOD OF USING SAME

BACKGROUND OF THE INVENTION

1. Field of the Invention

This invention relates to detecting radiation in fluids, and more particularly, to a flowthrough labyrinth device configured to receive a fluid to be tested and evenly distribute the fluid to be tested around a radiation detecting device and a method of detecting radiation in fluids using the same.

2. Description of Related Art

Radiation detection can be problematic, since potentially harmful radiation may be emitted from sources that appear innocuous. For example, since harmful radiation may be colorless, odorless and/or tasteless it may be difficult to detect and/or even perceive without proper radiation detecting equipment. Furthermore, in order to detect both the presence and quantity of potentially harmful radiation the radiation detecting equipment may need to be exposed to the potential source of the radiation for a prolonged period of time. For example, in the case of detecting potentially harmful radiation in fluids, such as a water source, a fluid sample must be collected and then positioned relative to the radiation detecting equipment. For example, previous devices used in the detection of radiation in fluids were measurement containers, referred to as beakers, which included a container to hold the fluid and a well formed in the container to hold a radiation detection mechanism. These beakers required the fluid sample to be poured into the container, and then the container placed over the radiation detection mechanism for the required amount of time. Upon the expiration of the required amount of time, the container was then emptied, and a new fluid sample was poured into the container. However, a significant amount of labor may be required in the use of such sampling and detecting procedures. Therefore, it may be desirable to provide a device that can provide continuous and/or intermittent operation for the detection of potentially harmful radiation in fluids with minimal interaction and/or monitoring.

SUMMARY OF THE INVENTION

The present invention is designed to overcome the above noted limitations that are attendant upon the use of conventional fluid radiation detecting systems and, toward this end, it contemplates the provision of a novel continuous labyrinth flowthrough device that is configured to evenly distribute a fluid sample at least partially around a radiation detecting device.

Accordingly, it is an object of the present invention to provide a continuous labyrinth flowthrough device that is configured for use as a container, reservoir and/or passageway for a fluid sample that it is desirable to determine whether the fluid sample contains radiation.

It is another object of the present invention that the continuous labyrinth flowthrough device provides a uniform volume of the fluid sample surrounding a radiation detecting device.

It is still another object of the present invention to maximize the volume of the fluid sample surrounding the radiation detecting device in order to increase detection efficiency.

It is yet another object of the present invention to surround the radiation detecting device by an even volume of the fluid sample along the outer diameter and at least one face of the radiation detecting device.

It is still another object of the present invention that the continuous labyrinth flowthrough device contains a continuous flowpath for the fluid sample that reduces and/or eliminates empty spaces within the continuous labyrinth flowthrough device that do not contain the fluid sample.

It is still further another object of the present invention that the continuous labyrinth flowthrough device may be configured to automatically receive another fluid sample, and that the other fluid sample flushes out the first fluid sample thereby avoiding the need to clean out the continuous labyrinth flowthrough device between fluid samples.

It is yet another object of the present invention that the continuous labyrinth flowthrough device in combination with the radiation detecting device may be used in a radiation monitoring system in order to detect the presence and/or amount of radiation in the fluid sample or in multiple fluid samples.

It is yet another object of the present invention that the flow of fluid through the continuous labyrinth flowthrough device can be adjusted to slow the volume of liquid exchanged or stop the flow intermittently in order to take intermittent counts for the radiation emitted by the fluid.

It is still another object of the present invention that the flow of fluid through the continuous labyrinth flowthrough device may be stopped in order to take longer counts for isoptic identification or longer sample count to compensate for radiation detecting device sensitivity.

According to an exemplary embodiment of the present invention, an apparatus, such as a continuous flowthrough labyrinth device, that has a detector well formed therein in which a radiation detection device may be placed is provided. The continuous flowthough labyrinth device allows a fluid sample to be introduced into a flow path of the continuous flowthrough labyrinth device so that the fluid sample evenly surrounds the top and side surfaces of the detector well, which results in the fluid sample being evenly distributed around the radiation detection device. The continuous flowthrough labyrinth device may be connected to any radiation level fluid monitoring system, for example systems used by municipalities and/or industries. The continuous flowthrough labyrinth device may be placed such that fluids entering and/or exiting systems are monitored for radiation, or even placed to determine the radiation levels of fluids within systems.

According to the exemplary embodiment of the present invention the apparatus is configured for use in detecting radiation in a fluid. The apparatus, which may be in the form of the continuous flowthrough labyrinth device, may include a cylindrical side wall having a first end and a second end, a circular face positioned at the first end of the cylindrical side wall, a first helical ramp extending around the cylindrical side wall at least part of the way from the first end to the second end of the cylindrical side wall, and a second helical ramp positioned substantially parallel with the first helical ramp and extending around the cylindrical side wall at least part of the way from the first end to the second end of the cylindrical side wall.

In accordance with this exemplary embodiment of the present invention, the cylindrical side wall and the circular face of the apparatus define a well formed within the apparatus, and the first helical ramp and the second helical ramp define a pair of substantially parallel channels extending around the cylindrical side wall of the apparatus at least part of the way from the first end to the second end of the cylindrical side wall. The pair of substantially parallel channels includes a first channel and a second channel.

In accordance with this exemplary embodiment of the present invention, the apparatus may also include a first spiral wall extending from the circular face, and a second spiral wall extending from the circular face and positioned substantially parallel to the first spiral wall.

In accordance with this exemplary embodiment of the present invention, the first spiral wall and the second spiral wall define a path on the circular face, and the path may include a first end connected to the first channel of the pair of substantially parallel channels, and a second end connected to the second channel of the pair of substantially parallel channels.

In accordance with this exemplary embodiment of the present invention, the first channel of the pair of substantially parallel channels, the path and the second channel of the pair of substantially parallel channels define a continuous labyrinth extending around at least a portion of the well formed within the apparatus.

In accordance with this exemplary embodiment of the present invention, the apparatus may also include a radiation detecting device positioned within the well, and an outer shell covering at least a portion of the cylindrical side wall and at least a portion of the circular face.

In accordance with this exemplary embodiment of the present invention, the outer shell may include a cylindrical body portion formed from a continuous wall configured to surround the cylindrical side wall, and a surface positioned substantially perpendicular to the cylindrical body portion configured to cover the circular face of the apparatus.

In accordance with this exemplary embodiment of the present invention, the cylindrical body portion of the outer shell contacts the first helical ramp and the second helical ramp, and the surface of the outer shell contacts the first spiral wall and the second spiral wall so as to form an enclosed continuous flow passage following and extending from the first channel of the pair of substantially parallel channels, through the path and through the second channel of the pair of substantially parallel channels. The enclosed continuous flow passage is formed by the continuous labyrinth being enclosed within the outer shell.

In accordance with this exemplary embodiment of the present invention, the enclosed continuous flow passage has a rectangular or square cross-section.

In accordance with this exemplary embodiment of the present invention, the outer shell also includes a first port and a second port, the first port is positioned at a first end of the enclosed continuous flow passage, and the second port is positioned at a second end of the enclosed continuous flow passage.

In accordance with this exemplary embodiment of the present invention, the outer shell also includes a first conduit coupled to the first port, and a second conduit coupled to the second port.

In accordance with this exemplary embodiment of the present invention, the apparatus is configured to receive an amount of a fluid in the first conduit coupled to the first port, and configured to release at least a portion of the amount of the first fluid out of the second conduit coupled to the second port.

In accordance with this exemplary embodiment of the present invention, the apparatus is further configured to retain at least a portion of the amount of the fluid in the enclosed continuous flow passage.

In accordance with this exemplary embodiment of the present invention, the apparatus is configured to transfer the amount of fluid through the first conduit to the first port, from the first port to the first end of the enclosed continuous flow passage, through the enclosed continuous flow passage to the second end of the enclosed continuous flow passage, from the second end to the second port and from the second port through the second conduit.

In accordance with this exemplary embodiment of the present invention, the radiation detecting device may include a detector to detect radiation.

In accordance with this exemplary embodiment of the present invention, the radiation detecting device is coupled to a processing device configured read a signal generated by the radiation detecting device, and the signal includes an indication regarding presence of radiation.

In accordance with this exemplary embodiment of the present invention, the enclosed continuous flow passage surrounds at least a portion of the radiation detecting device, and the radiation detecting device is configured to detect radiation emitted from the portion of the amount of the fluid within the enclosed continuous flow passage.

Another exemplary embodiment of the present invention is directed to a method of detecting radiation in a fluid that may include providing an apparatus configured to retain an amount of the fluid, where the apparatus includes a flowthrough labyrinth device, and an outer shell positioned over at least a portion of the flowthrough labyrinth device. The method also includes providing a radiation detecting device positioned within the flowthrough labyrinth device and configured to detect radiation emitted from the amount of fluid retained within the apparatus, and generating a signal from the radiation detecting device indicating the presence of radiation.

In accordance with this exemplary embodiment of the present invention, the flowthrough labyrinth device may include a cylindrical side wall having a first end and a second end, a circular face positioned at the first end of the cylindrical side wall, a first helical ramp extending around the cylindrical side wall at least part of the way from the first end to the second end of the cylindrical side wall, and a second helical ramp positioned substantially parallel with the first helical ramp and extending around the cylindrical side wall at least part of the way from the first end to the second end of the cylindrical side wall.

In accordance with this exemplary embodiment of the present invention, the cylindrical side wall and the circular face define a well formed within the flowthrough labyrinth device, and the first helical ramp and the second helical ramp define a pair of substantially parallel channels extending around the cylindrical side wall at least part of the way from the first end to the second end of the cylindrical side wall.

In accordance with this exemplary embodiment of the present invention, the flowthrough labyrinth device may also include a first spiral wall extending from the circular face, and a second spiral wall extending from the circular face and positioned substantially parallel to the first spiral wall, the first spiral wall and the second spiral wall define a path on the circular face, and the path may include a first end connected to a first channel of the pair of substantially parallel channels, and a second end connected to a second channel of the pair of substantially parallel channels.

In accordance with this exemplary embodiment of the present invention, the outer shell may include a cylindrical body portion formed from a continuous wall surrounding the cylindrical side wall, and a surface positioned substantially perpendicular to the cylindrical body portion covering the circular face.

In accordance with this exemplary embodiment of the present invention, the cylindrical body portion contacts the first helical ramp and the second helical ramp, and the surface contacts the first spiral wall and the second spiral wall so as to form an enclosed continuous flow passage following the first channel of the pair of substantially parallel channels, the path and the second channel of the pair of substantially parallel channels.

In accordance with this exemplary embodiment of the present invention, the outer shell may also include a first port and a second port, the first port is positioned at a first end of the enclosed continuous flow passage, and the second port is positioned at a second end of the enclosed continuous flow passage.

In accordance with this exemplary embodiment of the present invention, the outer shell may also include a first conduit coupled to the first port, and a second conduit coupled to the second port.

In accordance with this exemplary embodiment of the present invention, the method may also include introducing the amount of fluid into the first conduit, continuing to provide the amount of fluid into the first conduit so that the amount of fluid enters the first end of the enclosed continuous flow passage and at least a portion of the amount of fluid exits from the second end of the enclosed continuous flow passage into the second port, and retaining the amount of fluid in the enclosed continuous flow passage for a period of time so that the radiation detecting device is at least partially surrounded by the amount of fluid.

In accordance with this exemplary embodiment of the present invention, the method may also include transmitting the signal from the radiation detecting device to a processing device configured to read the signal for the indication of the presence of radiation, and generating a perceptible indication as to the presence of radiation within the fluid.

In accordance with this exemplary embodiment of the present invention, the radiation detecting device may include a detector to detect radiation.

BRIEF DESCRIPTION OF THE SEVERAL VIEWS OF THE DRAWINGS

For a fuller understanding of the nature and object of the present invention, reference should be had to the following detailed description taken in connection with the accompanying drawings, in which.

DETAILED DESCRIPTION OF THE INVENTION

The present invention now will be described more fully hereinafter with reference to the accompanying figures, in which exemplary embodiments of the invention are shown. The invention may, however, be embodied in many different forms and should not be construed as limited to the embodiments set forth herein. Like reference numerals refer to like elements throughout.

Referring first to FIGS. 1-4, therein illustrated is an exemplary embodiment of a continuous flowthrough labyrinth device, generally indicated by reference numeral 10, of the present invention. The continuous flowthrough labyrinth device 10 includes a substantially cylindrical side wall 12 that forms a detector well 14 within the continuous flowthrough labyrinth device 10. The continuous flowthrough labyrinth device 10 also includes substantially circular face 16 positioned at one end of the substantially cylindrical side wall 12, and an opening 18 positioned at the opposite end of the substantially cylindrical side wall 12 leading into the detector well 14.

The continuous flowthrough labyrinth device 10 also includes a first helical ramp 20 and a second helical ramp 22 extending from an outer surface of the substantially cylindrical side wall 12 opposite the detector well 14 so that the first helical ramp 20 and the second helical ramp 22 extend from the continuous flowthrough labyrinth device 10. Each of the first helical ramp 20 and the second helical ramp 22 wind around at least a portion of the outer surface of the substantially cylindrical side wall 12 and each may extend from the end of the substantially cylindrical side wall 12 having the opening positioned 18 therein to the end having the substantially circular face 16 positioned thereon. It is understood that the each of the first helical ramp 20 and/or the second helical ramp 22 may be either right-handed or left-handed, and the present invention is not limited by such property of the first helical ramp 20 and or the second helical ramp 22. It is also understood that each turn of the first helical ramp 20 may be equally spaced from each turn of the second helical ramp 22 so that the equal spacing between each of the turns forms a pair of flow channels 24 around the outer surface of the substantially cylindrical side wall 12 between the first helical ramp 20 and the second helical ramp 22. Each of the pair of flow channels 24 terminates at a walled end 26 positioned substantially adjacent to the opening 18 at one of the ends of the substantially cylindrical side wall 12. Furthermore, each of the first helical ramp 20 and the second helical ramp 22 includes an opening 27 in the ends of each of the first helical ramp 20 and the second helical ramp 22 positioned substantially adjacent to the substantially circular face 16. In this manner, as discussed further below, it is understood that a fluid may be introduced into one of the pair of flow channels 24 at the walled end 26, and the fluid may travel along the flow channel 24 until the fluid reaches the opening 27 formed in the corresponding first helical ramp 20 or second helical ramp 22.

Still referring to FIGS. 1-4, the continuous flowthrough labyrinth device 10 also includes a spiral channel 28 positioned on the substantially circular face 16, and formed from a pair spiral extension walls 30 extending from the substantially circular face 16. The pair of spiral extension walls 30 may be positioned substantially parallel to each other over at least a portion of each of the spiral extension walls 30, however it is understood that the present invention is not limited to such a configuration and other configurations are also contemplated and included in aspects of the present invention. The spiral channel 28 is positioned to connect each of the pair of flow channels 24 with each other by having each of the openings 27 in the first helical ramp 20 and the second helical ramp 22 positioned so that each of the pair of flow channels 24 has a connection to one end of the spiral channel 28. The continuous flowthrough labyrinth device 10 may also include a ring flange 32 positioned so as to surround at least a portion of the circumference of the opening 18 of the detector well 14.

Figure 1:
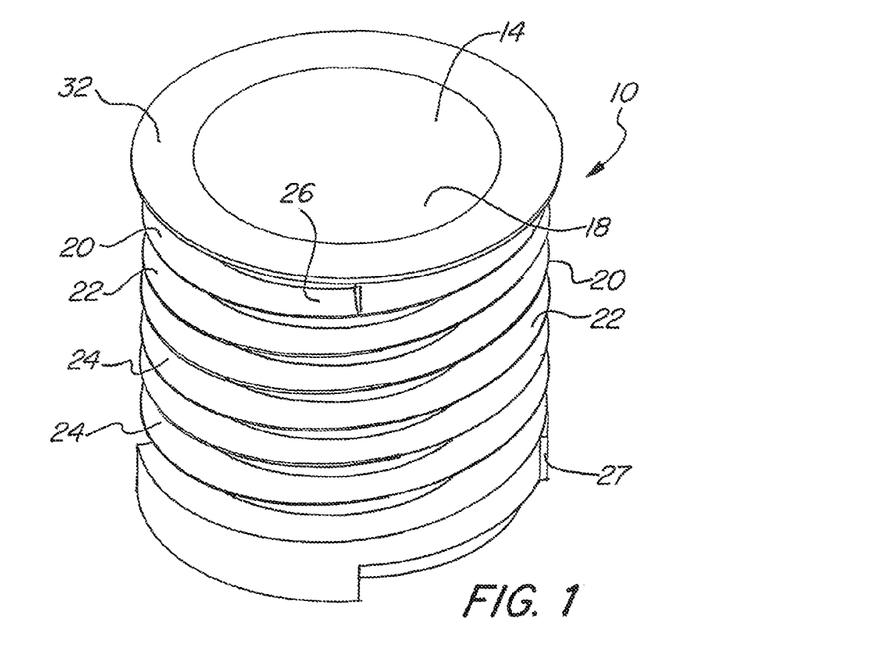
FIG. 1 is a perspective view of an exemplary continuous flowthrough labyrinth device according to the present invention.
Figure 2:
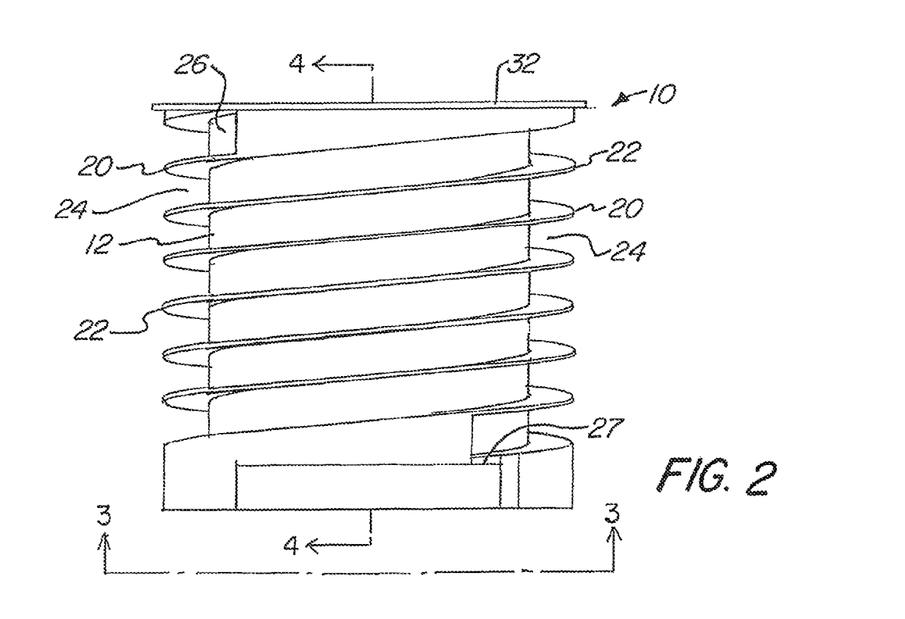
FIG. 2 is a side view of the exemplary continuous flowthrough labyrinth device according to the present invention.
Figure 3:
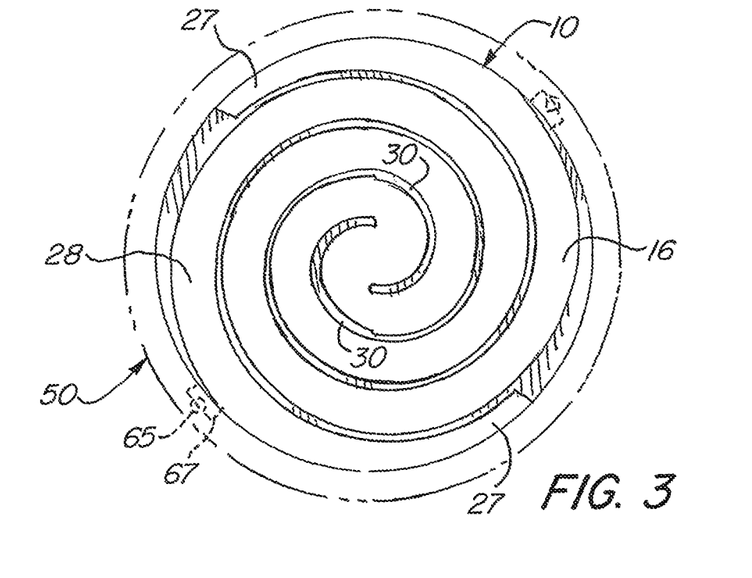
FIG. 3 is a top plan view along line 3-3 in FIG. 2 of the exemplary continuous flowthrough labyrinth device according to the present invention.
Figure 4:
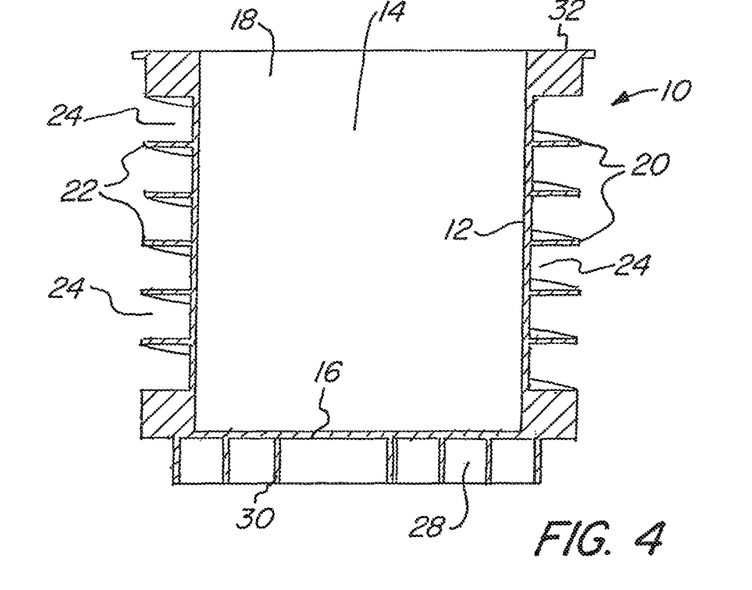
FIG. 4 is a cross-sectional view along line 4-4 in FIG. 2 of the exemplary continuous flowthrough labyrinth device according to the present invention.
Figure 5:
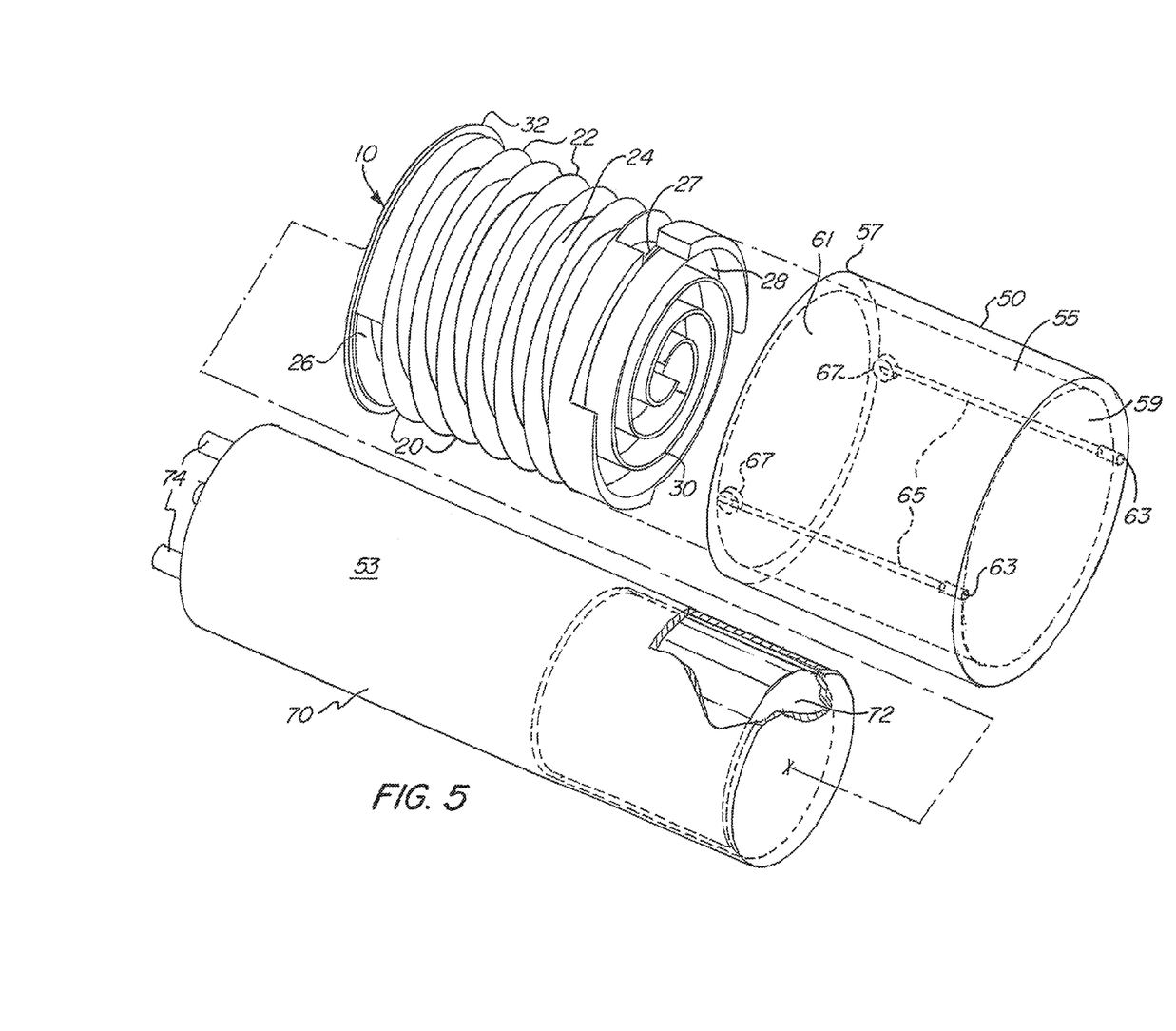
FIG. 5 is an exploded perspective view showing how the exemplary continuous flowthrough labyrinth device in combination may be combined with an outer shell and a radiation detecting device in accordance with the present invention.

Referring now to FIG. 5, the continuous flowthrough labyrinth device 10 may be used in combination with an outer shell 50 and a radiation detecting device 53. The outer shell 50 may be substantially cylindrical and dimensioned so as to fit over the continuous flowthrough labyrinth device 10. The outer shell 50 includes a substantially cylindrical body portion 55 formed from a continuous wall 57 that is configured to wrap around the continuous flowthrough labyrinth device 10 when the continuous flowthrough labyrinth device 10 is inserted into the outer shell 50. The outer shell 50 also includes a surface 59 enclosing one end of the cylindrical body portion 55 and an aperture 61 positioned at the other end of the cylindrical body portion 55. The surface 59 is configured so that the surface 59 and the continuous wall 57 are positioned to enclose the pair of flow channels 24 and spiral channel 28 of the continuous flowthrough labyrinth device 10 when the continuous flowthrough labyrinth device 10 is inserted through the aperture 61 into the outer shell 50 in the manner shown in FIG. 5. The outer shell 50 also includes a pair of bores 63 formed in the continuous wall 57, and each of the bores 63 is connected to a conduit 65 in the continuous wall 57 and running substantially parallel along the continuous wall 57. Each of the conduits 65 are connected with a port 67 forming an opening in the continuous wall 57 towards the interior region of the outer shell 50. Each of the ports 67 are positioned so as to align with the walled end 26 of one of the pair of flow channels 24 when the continuous flowthrough labyrinth device 10 is inserted through the aperture 61 into the outer shell 50, so that each of the pair of flow channels 24 is coupled to one of the ports 67. While the outer shell 50 is shown having the pair of conduits 65 running through the continuous wall 57 it is understood that the pair of conduits 65 may be formed and/or positioned on the outside of the outer wall 50, and the pair of ports 67 extended an appropriate distance through the continuous wall 57 in order to be coupled to the conduits 65. It is further understood that the ring flange 32 may be configured so as to form a sealed connection with the outer shell 50. The sealed connection may include a washer (not shown), O-ring (not shown), which may be made of an appropriate material such as plastic or rubber, or be ultrasonically welded.

Still referring to FIG. 5, the radiation detecting device 53 includes a body 70 and a detector crystal 72 positioned within the body 70. The detector crystal 72 is configured to detect radiation by generating an output whenever radiation is detected by the detector crystal 72. For example, the detector crystal 72 may be a scintillator material, such as a sodium iodide crystal, that exhibits luminescence whenever radiation comes into contact with the detector crystal 72. This luminescence may then be read by appropriate devices (not shown) within the body 70 of the radiation detecting device 53, and the reading of the radiation may be transmitted as a signal from the radiation detecting device 53 through the one or more detector connectors 74, which may be positioned at an end of the body 70. As shown in FIG. 5, the radiation detecting device 53 is configured and dimensioned to fit within the detector well 14 of the continuous flowthrough labyrinth device 10 so that the continuous flowthrough labyrinth device 10 surrounds at least the detector crystal 72 of the radiation detecting device 53. It is understood that the exemplary embodiment of the radiation detecting device 53 shown in FIG. 5 is merely provided as an example of a radiation detecting device 53 that may be used with the continuous flowthrough labyrinth device 10 according to the present invention. However, it is understood that any suitable radiation detecting device 53 may be used with the continuous flowthrough labyrinth device 10 in accordance with the present invention.

The continuous flowthrough labyrinth device 10 may be made from any suitable plastic or similar composition or metal (such as aluminum or stainless steel). The outer shell may preferably be made from a plastic or metal, and may be made from the same material as the continuous flowthrough labyrinth device 10. While it may be preferable to make the continuous flowthrough labyrinth device 10 from a single component, it is understood that the present invention is not limited to such construction, and that the continuous flowthrough labyrinth device 10 may be made from multiple components suitably bonded or affixed together to form the continuous flowthrough labyrinth device 10. As mentioned above, the radiation detecting device 53 may include a detector crystal 72 formed from a sodium iodide crystal or any other material which exhibits luminescence when contacted by radiation. The radiation detecting device 53 may also be any other known device or material that is capable of detecting and reporting the presence of radiation.

Figure 6:
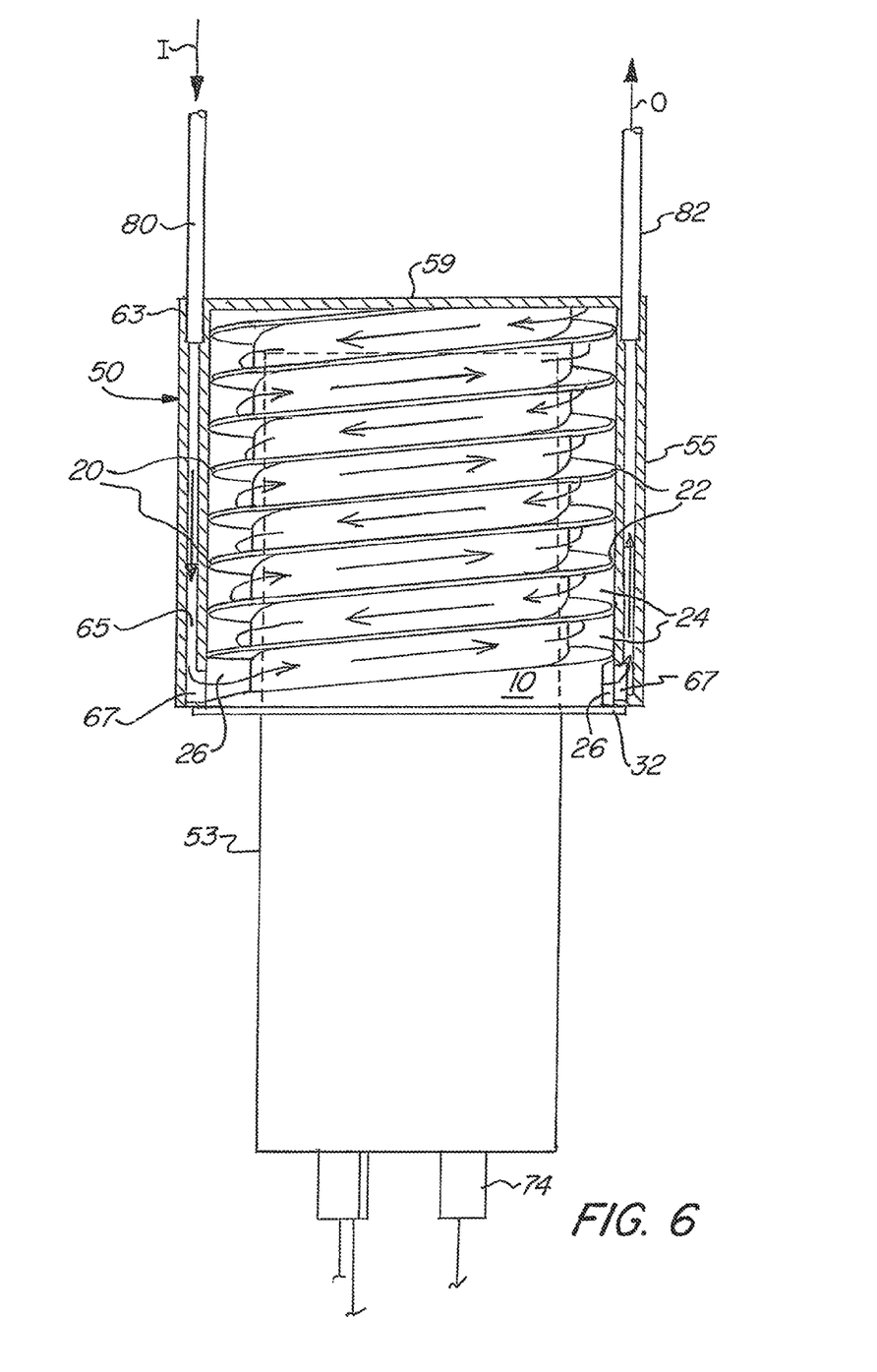
FIG. 6 is a side view of the combination of the exemplary continuous flowthrough labyrinth device, outer shell and radiation detecting device according to the present invention with the outer shell represented in a cut-away view.
Figure 7:
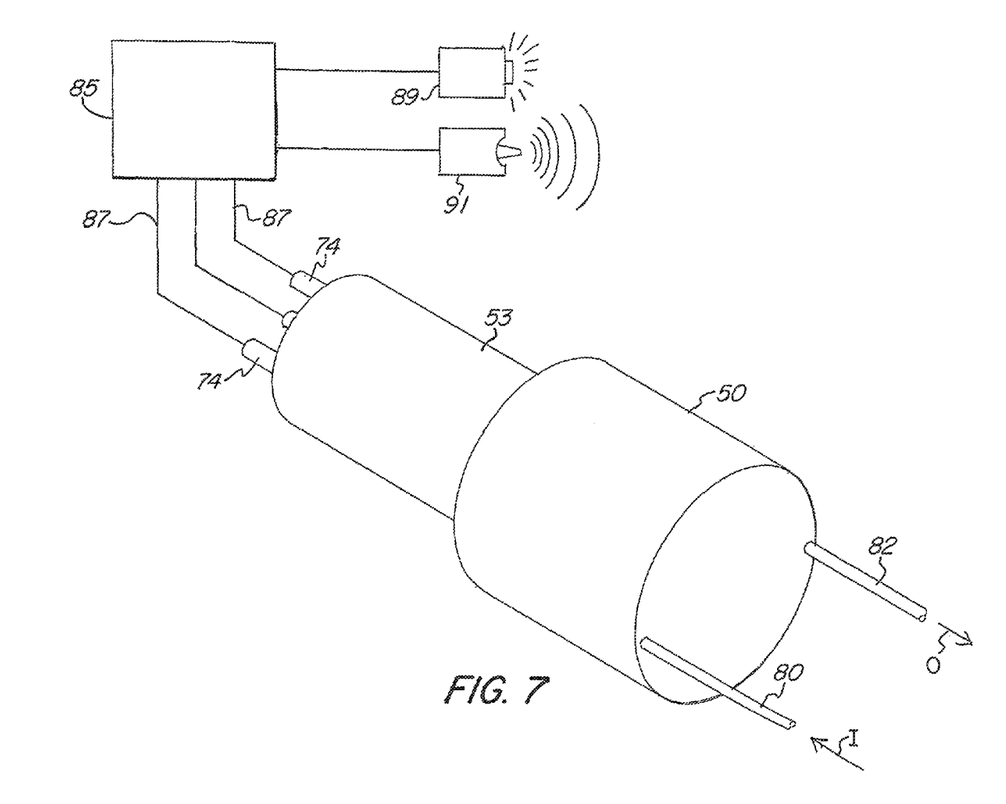
FIG. 7 is a perspective and schematic view of an exemplary radiation detection system using the combination of the exemplary continuous flowthrough labyrinth device, outer shell and radiation detecting device according to the present invention.

Referring now to FIGS. 6 and 7, the operation and use of the continuous flowthrough labyrinth device 10 in combination with the outer shell 50 and the radiation detecting device 53 will now be discussed. As shown in FIG. 6, the outer shell 50 is dimensioned to fit snuggly over the continuous flowthrough labyrinth device 10 so that the continuous wall 57 forming the substantially cylindrical body portion 55 forms a isolated flowpath with both of the pair of flow channels 24 running around the continuous flowthrough labyrinth device 10. Likewise, the outer shell 50 is also dimensioned so that the surface 59 fits snuggly with the pair of spiral extension walls 30 (not shown in FIG. 6) in order to form an isolated spiral flowpath (not shown) on the substantially circular face 16 of the continuous flowthrough labyrinth device 10. In this manner, a continuous isolated flowpath is formed when the continuous flowthrough labyrinth device 10 is inserted into and fit with the outer shell 50. One of the walled ends 26 is positioned so as to be aligned with one of the ports 67 formed in the outer shell 50, and the other walled end 26 is likewise aligned with the other port 67 formed in the outer shell 50. Therefore, it is understood that the continuous isolated flowpath may begin at one of the walled ends 26 aligned with one of the ports 67, coil around the continuous flowthrough labyrinth device 10 in a direction towards the substantially circular face 16 of the continuous flowthrough labyrinth device 10, extend through the spiral channel 28, coil around the continuous flowthrough labyrinth device 10 in a direction back towards the other walled end 26 and come to a conclusion at the other walled end aligned with the other port 67. The continuous isolated flowpath formed in this manner may have a substantially rectangular or square cross-section.

Still referring to FIGS. 6 and 7, an inlet tube 80, which may be formed from a tube or hose, may be inserted into one of the bores 63 of the outer shell 50 and/or coupled to one of the pair of conduits 65 running through the cylindrical body portion 55 of the outer shell 50. The inlet tube 80 is configured to provide a fluid (not shown) in the direction shown by arrow I so that the fluid travels down the conduit 65 coupled to the inlet tube 80 through the port 67 and enters the continuous isolated flowpath at the port 67. The fluid may be from any source or sample from which it is desirable to test and/or monitor the presence and/or level of radiation. As the fluid enters the continuous isolated flowpath, the fluid travels around the continuous flowthrough labyrinth device 10 in the manner shown by the arrows in FIG. 6. It is understood that the alternating loops of the continuous isolated flowpath carry the fluid in opposite directions around the continuous flowthrough labyrinth device 10 so that the fluid evenly surrounds the radiation detecting device 53 inserted into the detector well 14.

As shown in FIG. 6, one set of the alternating loops of the continuous isolated flowpath carry the fluid towards the spiral channel 28, which forms a part of the continuous isolated flowpath, and the other set of the alternating loops carries the fluid away from the spiral channel 28 and towards the other port 67, which is coupled to an outlet tube 82, which may be formed from a tube or hose, that may be inserted into the other bore 63 of the outer shell 50 and/or coupled to the other conduit 65 running through the cylindrical body portion 55 of the outer shell 50. The outlet tube 82 is configured to provide the fluid in the direction shown by arrow O so that the fluid travels away from the continuous flowthrough labyrinth device 10 and the radiation detecting device 53. The fluid may travel through the continuous flowthrough labyrinth device 10 in a continuous manner and/or may be introduced into the continuous flowthrough labyrinth device 10 at intermittent and/or predetermined time intervals and remain in the continuous flowthrough labyrinth device 10 for a predetermined amount of time in order to expose the radiation detecting device 53 to the fluid so as to be able to detect the presence and/or amount of any radiation in the fluid. It is understood that a pump (not shown) or other mechanism may be used to cause the fluid to travel to, through and away from the continuous flowthrough labyrinth device 10. The pump (not shown) may be of any suitable design as known to one of ordinary skill in the art. It is also understood that the fluid may be forced through the continuous flowthrough labyrinth device 10 through the use of a pressure differential between the fluid on the inlet tube 80 side and the fluid on the outlet tube 82 side.

As shown schematically in FIG. 7, the radiation detecting device 53 is configured to be coupled to a device 85 configured to read and/or interpret the output from the radiation detecting device 53. The device 85 may for example be a computer or other appropriate processing device. The device 85 may be coupled to the connectors 74 of the radiation detecting device 53 by one or more leads 87 that are configured to transmit signals to and/or from the device 85. It is understood that while wired leads 87 may be shown in FIG. 7, the present invention also contemplates the use of wireless communication from the radiation detecting device 53 to the device 85. The device 85 may be configured to record any data received from the radiation detecting device 53, and either generate a continuous report or a report on the data received at predetermined intervals. In addition, the device 85 may be coupled to one or more alarms, for example a visual alarm 89 and/or an audio alarm 91 that are configured to generate an indication when a predetermined level of radioactivity is detected in the fluid sample currently present in the continuous flowthrough labyrinth device 10.

It is understood that the continuous flowthrough labyrinth device 10 in combination with the radiation detecting device 53 may be connected to any radiation level fluid monitoring system, including, but not limited to, systems used by municipalities or industries. For example, the combination of the continuous flowthrough labyrinth device 10 and the radiation detecting device 53 may be installed in a municipal water system in order to detect the presence and/or amount of radiation in the drinking water that is treated and/or supplied by the municipal water system. The combination may also be used in an industrial manufacturing plant that produces fluid based products in order to either detect the presence and/or amount of radiation in the fluids that are used in the formation of the products, the presence and/or amount of radiation in the finished products or both. Furthermore, the combination of the continuous flowthrough labyrinth device 10 and the radiation detecting device 53 may also be used in an industrial facility that handles and/or products radioactive materials in order to test for and/or monitor the presence and/or amount of radiation in fluids within and/or exiting the facility.

It is further understood that the combination of the continuous flowthrough labyrinth device 10 and the radiation detecting device 53 may be positioned along any portion of the systems used by municipalities or industries. For example, one of the combinations may be placed so as to monitor fluids entering the system, and another combination may be placed so as to monitor fluids exiting from the system. However, the present invention is not limited to the number of combinations used and/or the positioning of the combinations within and/or adjacent to the systems. It may be desirable, that a plurality of the combinations of the continuous flowthrough labyrinth device 10 and the radiation detecting device 53 may be used in parallel in order to enable more than one reading of radiation levels within the system containing, producing and/or receiving fluids. It may also be desirable, that a plurality of the combinations of the continuous flowthrough labyrinth device 10 and the radiation detecting device 53 may be used in series in order to facilitate in the identification of the radiation that may be present in the tested fluid samples.

Referring again to FIGS. 6 and 7, it is understood that the combination of the continuous flowthrough labyrinth device 10, the radiation detecting device 53 and the outer shell 50 may be configured to receive a continuous flow of fluid for monitoring and/or testing through the inlet tube 80 and out of the outlet tube 82. It is also understood that the combination may be used to receive a fluid sample of a predetermined volume, and retain the fluid sample within the continuous isolated flowpath formed by the continuous flowthrough labyrinth device 10 and the outer shell 50 for a predetermined amount of time in order to allow testing of the fluid sample by the radiation detecting device 53. Preferably, the continuous flowthrough labyrinth device 10 is configured so that the fluid sample retained within the continuous isolated flowpath is spaced substantially equally around the radiation detecting device 53, and equally surrounds the radiation detecting device 53. It is understood that the configuration of the continuous flowthrough labyrinth device 10 according to exemplary embodiments of the present invention may be such that a uniform volume of the fluid sample is maintained around the faces of the radiation detecting device 53, and that dead zones that may be created by tubular flowpaths are minimized by the use of a rectangular or square cross-sectional flowpath. It is further understood that in order to introduce a new fluid sample, the new fluid sample is introduced into the inlet tube 80 and travels through one of the conduits 65 coupled to the inlet tube 80 in the outer shell 50 until the new fluid sample reaches the continuous isolated flowpath formed by the continuous flowthrough labyrinth device 10 and the outer shell 50. Due to the configuration of the continuous isolated flowpath the new fluid sample will substantially push the previous fluid sample out of the continuous isolated flowpath so that the previous fluid sample is substantially cleaned out of the continuous isolated flowpath. In this manner one the new fluid sample begins to exit from the outlet tube 82, the new fluid sample is known to substantially surround the top and sides of the detector well 14, and as a result the radiation detecting device 53 as well. As a result, minimal interaction is required to introduce new fluid samples into the continuous isolated flowpath, since the previous fluid sample will be flushed out by the new fluid sample.

It will thus be seen that the objects set forth above, among those made apparent from the preceding description, are efficiently attained and, since certain changes may be made in the above article without departing from the scope of this invention, it is intended that all matter contained in this disclosure or shown in the accompanying drawings, shall be interpreted, as illustrative and not in a limiting sense.

It is to be understood that all of the present figures, and the accompanying narrative discussions of corresponding embodiments, do not purport to be completely rigorous treatments of the invention under consideration. It is to be understood that the above-described arrangements are only illustrative of the application of the principles of the present invention. Numerous modifications and alternative arrangements may be devised by those skilled in the art without departing from the scope of the present invention.

What is claimed is:

1. An apparatus configured for use in detecting radiation in a fluid, comprising:
    a cylindrical side wall having a first end and a second end;
    a circular face positioned at the first end of the cylindrical side wall;
    a first helical ramp extending around the cylindrical side wall at least part of the way from the first end to the second end of the cylindrical side wall;
    a second helical ramp positioned substantially parallel with the first helical ramp and extending around the cylindrical side wall at least part of the way from the first end to the second end of the cylindrical side wall; and
    a first spiral wall extending from the circular face, and a second spiral wall extending from the circular face and positioned substantially parallel to the first spiral wall;
    wherein the cylindrical side wall and the circular face define a well formed within the apparatus;
    wherein the first helical ramp and the second helical ramp define a pair of substantially parallel channels extending around the cylindrical side wall at least part of the way from the first end to the second end of the cylindrical side wall;
    wherein the first spiral wall and the second spiral wall define a path on the circular face; and
    wherein the path comprises a first end connected to a first channel of the pair of substantially parallel channels, and a second end connected to a second channel of the pair of substantially parallel channels.

2. The apparatus according to claim 1, wherein the first channel of the pair of substantially parallel channels, the path and the second channel of the pair of substantially parallel channels define a continuous labyrinth surrounding at least a portion of the well formed within the apparatus.

3. The apparatus according to claim 1, wherein the apparatus further comprises a radiation detecting device positioned within the well; and
    an outer shell covering at least a portion of the cylindrical side wall and at least a portion of the circular face.

4. The apparatus according to claim 3, wherein the outer shell comprises a cylindrical body portion formed from a continuous wall configured to surround the cylindrical side wall, and a surface positioned substantially perpendicular to the cylindrical body portion configured to cover the circular face; and
    wherein the apparatus further comprises:
    a first spiral wall extending from the circular face, and a second spiral wall extending from the circular face and positioned substantially parallel to the first spiral wall;
    wherein the first spiral wall and the second spiral wall define a path on the circular face; and
    wherein the path comprises a first end connected to a first channel of the pair of substantially parallel channels, and a second end connected to a second channel of the pair of substantially parallel channels.

5. The apparatus according to claim 4, wherein the cylindrical body portion of the outer shell contacts the first helical ramp and the second helical ramp, and the surface of the outer shell contacts the first spiral wall and the second spiral wall so as to form an enclosed continuous flow passage following the first channel of the pair of substantially parallel channels, the path and the second channel of the pair of substantially parallel channels.

6. The apparatus according to claim 5, wherein the enclosed continuous flow passage has a rectangular or square cross-section.

7. The apparatus according to claim 5, wherein the outer shell further comprises a first port and a second port, wherein the first port is positioned at a first end of the enclosed continuous flow passage, and the second port is positioned at a second end of the enclosed continuous flow passage, and
    wherein the outer shell further comprises a first conduit coupled to the first port, and a second conduit coupled to the second port.

8. The apparatus according to claim 7, wherein the apparatus is configured to receive an amount of a fluid in the first conduit coupled to the first port, and configured to release at least a portion of the amount of the first fluid out of the second conduit coupled to the second port;
    wherein the apparatus is further configured to retain at least a portion of the amount of the fluid in the enclosed continuous flow passage.

9. The apparatus according to claim 8, wherein the apparatus is configured to transfer the amount of fluid from the first port to the first end of the enclosed continuous flow passage, through the enclosed continuous flow passage to the second end of the enclosed continuous flow passage, and from the second end to the second port.

10. The apparatus according to claim 8, wherein the enclosed continuous flow passage surrounds at least a portion of the radiation detecting device, and the radiation detecting device is configured to detect radiation emitted from the portion of the amount of the fluid in the enclosed continuous flow passage.

11. The apparatus according to claim 3, wherein the radiation detecting device comprises a detector configured to detect radiation.

12. The apparatus according to claim 3, wherein the radiation detecting device is coupled to a processing device configured read a signal generated by the radiation detecting device, and wherein the signal comprises an indication regarding presence of radiation.

13. A method of detecting radiation in a fluid, comprising:
    providing an apparatus configured to retain an amount of the fluid, wherein the apparatus comprises a flowthrough labyrinth device, and an outer shell positioned over at least a portion of the flowthrough labyrinth device,
    providing a radiation detecting device positioned within the flowthrough labyrinth device and configured to detect radiation emitted from the amount of fluid retained within the apparatus, and generating a signal from the radiation detecting device indicating the presence of radiation, wherein the flowthrough labyrinth device comprises:
- a cylindrical side wall having a first end and a second end;
- a circular face positioned at the first end of the cylindrical side wall;
- a first helical ramp extending around the cylindrical side wall at least part of the way from the first end to the second end of the cylindrical side wall;
- a second helical ramp positioned substantially parallel with the first helical ramp and extending around the cylindrical side wall at least part of the way from the first end to the second end of the cylindrical side wall; and
- a first spiral wall extending from the circular face, and a second spiral wall extending from the circular face and positioned substantially parallel to the first spiral wall;
- wherein the cylindrical side wall and the circular face define a well formed within the flowthrough labyrinth device;
- wherein the first helical ramp and the second helical ramp define a pair of substantially parallel channels extending around the cylindrical side wall at least part of the way from the first end to the second end of the cylindrical side wall;
- wherein the first spiral wall and the second spiral wall define a path on the circular face; and
- wherein the path comprises a first end connected to a first channel of the pair of substantially parallel channels, and a second end connected to a second channel of the pair of substantially parallel channels.

14. The method according to claim 13, wherein the outer shell comprises a cylindrical body portion formed from a continuous wall surrounding the cylindrical side wall, and a surface positioned substantially perpendicular to the cylindrical body portion covering the circular face; and wherein the method further comprises installing the outer shell on the flowthrough labyrinth device so that the cylindrical body portion of the outer shell contacts the first helical ramp and the second helical ramp of the flowthrough labyrinth device, and the surface contacts the first spiral wall and the second spiral wall so as to form an enclosed continuous flow passage following the first channel of the pair of substantially parallel channels, the path and the second channel of the pair of substantially parallel channels.

15. The method according to claim 14, wherein the outer shell further comprises a first port and a second port, wherein the method further comprises positioning the first port at a first end of the enclosed continuous flow passage, and positioning the second port at a second end of the enclosed continuous flow passage, and wherein the outer shell further comprises a first conduit coupled to the first port, and a second conduit coupled to the second port.

16. The method according to claim 15, wherein the method further comprises introducing the amount of fluid into the first conduit, continuing to provide the amount of fluid into the first conduit so that the amount of fluid enters the first end of the enclosed continuous flow passage and at least a portion of the amount of fluid exits from the second end of the enclosed continuous flow passage into the second port, and retaining the amount of fluid in the enclosed continuous flow passage for a period of time so that the radiation detecting device is at least partially surrounded by the amount of fluid.

17. The method according to claim 13, wherein the method further comprises:
- transmitting the signal from the radiation detecting device to a processing device configured to read the signal for the indication of the presence of radiation, and
- generating a perceptible indication as to the presence of radiation within the fluid.

* * * * *